(No Model.)
W. PARKS, Sr., & W. L. PARKS, Jr.
MEAT CLAMP
No. 348,769. Patented Sept. 7, 1886.
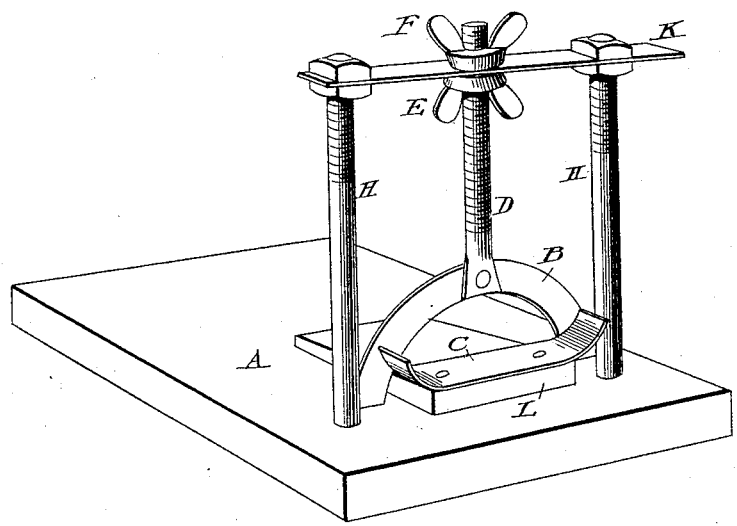
Witnesses:
A. B. Richmond
Chas. J. Richmond
Inventors.
William Parks Sr
William Levi Parks Jr

UNITED STATES PATENT OFFICE.

WILLIAM PARKS, SR., AND WILLIAM LEVI PARKS, JR., OF MEADVILLE, PA.

MEAT-CLAMP.

SPECIFICATION forming part of Letters Patent No. 348,769, dated September 7, 1886.

Application filed February 25, 1886. Serial No. 193,117. (No model.)

*To all whom it may concern:*

Be it known that we, WILLIAM PARKS, Sr., and WILLIAM LEVI PARKS, Jr., citizens of the United States, residing in the city of Meadville, in the county of Crawford and State of Pennsylvania, have invented a new and useful meat-clamp for butcher's tables to hold the meat while being cut into slices for customers, of which the following is a specification, reference being had to the accompanying drawing, and the letters of reference marked thereon.

The drawing is a perspective view of our device with all its parts adjusted in working order.

A is a bottom board or plank.

H H are two upright iron posts screwed into the board A.

K is a cross-piece thereon, secured by nuts or rivets.

L is a wedge-shaped board laid on the bottom A. This board may be of any desired size or shape to be well adapted to the meat to be cut.

C is an iron jaw bolted on the board L, with the ends thereof turning up in a semicircular form, as shown in the drawing, for the purpose of holding the meat in its place.

D is a screw-bolt passing through the cross-piece K, which is provided with apertures, and is raised or lowered by the screw-nuts F and E.

On the end of the screw-bolt D is a semicircular jaw, B, which, in combination with the jaw C, forms a secure clamp to hold the meat laid on the board L between them, while the same is being cut or sawed into slices.

We claim as our invention, and desire to secure by Letters Patent, the following:

In a meat-clamp, the combination of the bottom board, A, the wedge shaped board L, secured thereto and provided with the jaw C, the uprights H, apertured cross-piece K, screw-bolt D, semicircular jaw B, and nuts E F, substantially as described.

WILLIAM PARKS, SR.
WILLIAM LEVI PARKS, JR.

Witnesses:
CHAS. E. RICHMOND,
A. B. RICHMOND.